US008678362B1

(12) United States Patent
Luthi et al.

(10) Patent No.: US 8,678,362 B1
(45) Date of Patent: Mar. 25, 2014

(54) ADJUSTABLE LINK CLAMP

(71) Applicant: Vektek, Inc., Emporia, KS (US)

(72) Inventors: Aaron Vernon Luthi, Madison, KS (US); Michael Dean Swan, Madison, KS (US)

(73) Assignee: Vektek, Inc., Emporia, KS (US)

( * ) Notice: Subject to any disclaimer, the term of this patent is extended or adjusted under 35 U.S.C. 154(b) by 25 days.

(21) Appl. No.: 13/662,951

(22) Filed: Oct. 29, 2012

(51) Int. Cl.
*B23Q 3/08* (2006.01)

(52) U.S. Cl.
USPC .................. 269/25; 269/56; 269/91; 269/239

(58) Field of Classification Search
USPC ...................... 269/20, 21, 25, 27, 31, 91, 239
See application file for complete search history.

(56) References Cited

U.S. PATENT DOCUMENTS 2,421,957 A * 6/1947 Mead .............................. 269/34
2,505,801 A * 5/1950 Smith .......................... 269/87.1
2,747,535 A * 5/1956 Curry .............................. 269/34
3,116,058 A * 12/1963 Blatt ............................... 269/31
3,371,923 A * 3/1968 Blatt ............................... 269/32
3,482,438 A * 12/1969 Toyne ............................. 73/825
3,735,972 A * 5/1973 Blatt ............................. 269/228
4,076,227 A * 2/1978 Rameson ........................ 269/25
5,192,058 A 3/1993 VanDalsem et al.
5,647,581 A * 7/1997 Corle .............................. 269/32
5,752,693 A * 5/1998 Brisco ............................ 269/24
5,820,118 A 10/1998 Craft
6,416,045 B1 7/2002 Morroney
6,648,317 B2 11/2003 Takahashi et al.
6,736,384 B2 * 5/2004 Yokota ............................ 269/32
6,886,820 B1 * 5/2005 Hausler, III ..................... 269/24
7,007,938 B2 * 3/2006 Nakata et al. ................... 269/32
7,032,897 B2 4/2006 Hausler, III
7,121,539 B2 * 10/2006 McCormick et al. ......... 269/239
8,146,221 B2 * 4/2012 Hung .............................. 29/252
2009/0108513 A1 4/2009 Hara et al.
2012/0112397 A1 * 5/2012 Schauss .......................... 269/25
2012/0267838 A1 10/2012 Rentz

FOREIGN PATENT DOCUMENTS

WO WO2009087074 A1 7/2009

* cited by examiner

*Primary Examiner* — Lee D Wilson
*Assistant Examiner* — Jamal Daniel
(74) *Attorney, Agent, or Firm* — Hovey Williams LLP

(57) ABSTRACT

A link clamp for holding a part on a fixture has a housing with a bore with a longitudinal axis; a piston received in the bore and shiftable between retracted and extended positions; a clamping lever pivotally connected to one end of the piston; and a link assembly coupled for shifting the clamping lever between clamped and released positions. The clamping lever is configured to rotate relative to the housing in a single plane substantially perpendicular to the longitudinal axis of the bore so that the clamping lever may be positioned on any side of the housing without altering the distance between the contact point of the clamping lever and the mounting flange of the housing.

20 Claims, 6 Drawing Sheets

ADJUSTABLE LINK CLAMP

BACKGROUND

Hydraulic clamps are commonly used in manufacturing operations to hold and clamp parts to stationary fixtures so that the parts may be machined or otherwise worked upon. Hydraulic clamps typically include a housing adapted for attachment to a fixture, a piston telescopically received within the housing for movement between a clamped position and a released position when hydraulic fluid is supplied to the housing, and a clamping lever or head attached to the distal end of the piston for holding and clamping the part to the fixture when the piston is shifted to its clamped position. Typically, several such clamps are mounted to a single fixture so that a part can be securely held from several sides while it is worked upon.

Many different types of hydraulic clamps exist, and the types are typically categorized by the motion of the clamping levers. One common type is a link clamp, which has a clamping lever that pivots down when its piston is moved to its extended, clamped position and pivots up and out of the way when the piston is moved to its retracted, released position. Link clamps accommodate hard-to-reach or hard-to-hit clamping points and are preferred over swing clamps and other types of clamps when it is desired to reach over a part to clamp it, rather than swing around it.

Conventional link clamps are designed for holding parts directly in front of the clamps and therefore must be equipped with offset clamping levers to hold parts that are offset from the front of the clamps. Unfortunately, offset levers induce high eccentric loading and therefore necessitate a lower clamp pressure to prevent damage to the clamps. Offset levers also twist, bend, or otherwise distort while clamping, resulting in uneven clamping forces.

Adjustable link clamps have been developed to permit clamping in different positions with respect to the clamp housing, but known versions of these adjustable clamps suffer from various limitations that limit their utility.

SUMMARY

The present invention provides an improved adjustable link clamp with a clamping lever that can be rotated relative to its housing to provide a nearly infinite number of clamping positions. Importantly, the distance between a clamping point of contact on the clamping lever and the mounting flange of the housing does not change when the clamping lever is rotated so that the clamp doesn't have to be re-calibrated every time the position of the clamping lever is adjusted.

An embodiment of the link clamp broadly comprises a housing with a central bore having a longitudinal axis; a piston received in the bore and shiftable between retracted and extended positions; a clamping lever pivotally connected to an end of the piston; and a link assembly coupled with the clamping lever. The link assembly shifts the clamping lever to a clamped position when the piston is shifted to its extended position and shifts the clamping lever to a released position when the piston is shifted to its retracted position. Advantageously, the clamping lever may be rotated in any direction relative to the housing but only moves in a single plane substantially perpendicular to the longitudinal axis. This permits the clamping lever to be positioned on any side of the housing without altering the distance between the contact point of the clamping lever and the mounting flange of the housing.

The link clamp may be constructed in a variety of manners to provide relative rotational movement of the piston and clamping lever with respect to the housing. In one embodiment, a circular recess is formed in the top of the mounting flange. The recess has a floor with a raised circular rail that encircles the piston-receiving bore and a substantially vertically-extending bearing wall provided with a continuous groove. A circular lug is rotatably positioned in the circular recess. The lug includes an inwardly projecting lower shelf that defines a central hole aligned with the bore in the housing for permitting the piston to extend through the lug. A circular recess in the lower surface of the lug is positioned over and rides on the circular rail to facilitate rotation of the lug in the recess. The lug also includes a substantially vertically-extending outer bearing wall provided with a continuous groove that mates with the groove in the bearing wall of the recess to cooperatively define a ball bearing receiving channel. A plurality of ball bearings may be placed in the channel to facilitate rotation of the lug in the recess while preventing the lug from lifting out of the recess.

The ball bearings may be inserted in and removed from the channel by way of a channel extending through the housing. The opening in the channel may have internal threads for receiving a threaded set screw or other plug for retaining the ball bearings in the channels.

The lug also has one or more substantially vertically-extending holes with internal threads for receiving threaded set screws. The set screws may be tightened to lock the rotational position of the lug in the circular recess.

This summary is provided to introduce a selection of concepts in a simplified form that are further described in the detailed description below. This summary is not intended to identify key features or essential features of the claimed subject matter, nor is it intended to be used to limit the scope of the claimed subject matter. Other aspects and advantages of the present invention will be apparent from the following detailed description of the embodiments and the accompanying drawing figures.

BRIEF DESCRIPTION OF THE DRAWING FIGURES

Embodiments of the present invention are described in detail below with reference to the attached drawing figures, wherein.

Figure 1:
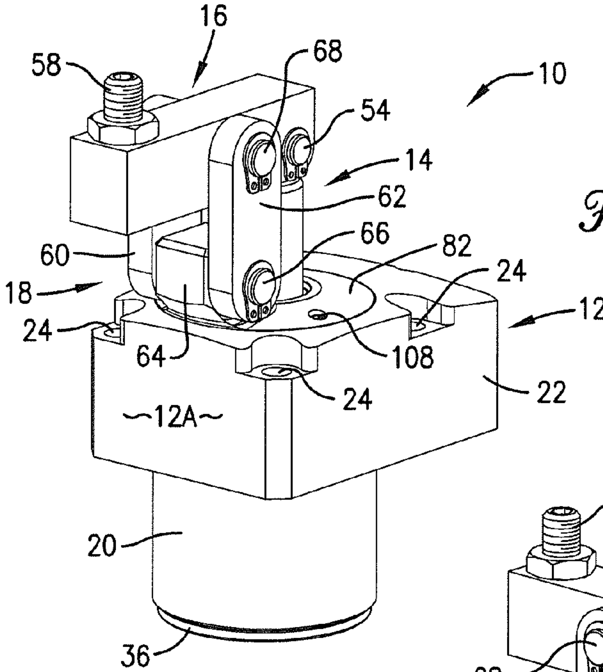
FIG. 1 is a front/side perspective view of a link clamp constructed in accordance with an embodiment of the present invention and shown with its clamping lever positioned in front of its housing and in a clamped position.

The drawing figures do not limit the present invention to the specific embodiments disclosed and described herein. The drawings are not necessarily to scale, emphasis instead being placed upon clearly illustrating the principles of the invention.

DETAILED DESCRIPTION

The following detailed description of embodiments of the invention references the accompanying drawings. The embodiments are intended to describe aspects of the invention in sufficient detail to enable those skilled in the art to practice the invention. Other embodiments can be utilized and changes can be made without departing from the scope of the claims. The following detailed description is, therefore, not to be taken in a limiting sense. The scope of the present invention is defined only by the appended claims, along with the full scope of equivalents to which such claims are entitled.

In this description, references to “one embodiment”, “an embodiment”, or “embodiments” mean that the feature or features being referred to are included in at least one embodiment of the technology. Separate references to “one embodiment”, “an embodiment”, or “embodiments” in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the present technology can include a variety of combinations and/or integrations of the embodiments described herein.

The present invention provides a link clamp that may be secured to a fixture (not shown) along with other similar clamps to secure a part to the fixture so the part may be machined or otherwise worked upon. As described in more detail below, the link clamp has a clamping lever that can be rotated relative to its housing to provide a nearly infinite number of clamping positions. Advantageously, the clamping lever only moves in one plane when rotated. This permits the clamping lever to be positioned on any side of the housing without altering the distance between a contact point of the clamping lever and the mounting flange of the housing Turning now to the drawing figures, and initially FIG. 1, a link clamp 10 constructed in accordance with specific embodiments of the invention is illustrated. The link clamp 10 broadly comprises a housing 12; a piston 14 extending from the housing and shiftable between retracted and extended positions; a clamping lever 16 pivotally connected to an end of the piston; and a link assembly 18 coupled with the clamping lever for shifting the clamping lever between clamped and released positions. The present description often describes the orientation of the clamping lever 16 with respect to the housing 12. For reference purposes, the front of the housing 12 is identified by 12A in FIG. 1, and the clamping lever is considered to be in front of the housing when oriented as shown in FIG. 1.

In more detail, the housing 12 may be formed of steel or any other suitable material and may be of any size and shape. An embodiment of the housing may include a cylindrical lower section 20 and an upper mounting flange section 22; however, the housing sections may be reversed and/or replaced with other housing sections of different shapes and sizes without departing from the principles of the present invention. In one embodiment, the lower housing section 20 may be received within an opening in a fixture and the upper mounting flange section 22 may be attached to a top surface of the fixture with bolts or other fasteners extending through recessed bolt holes 24 in the mounting flange.

Figure 7:
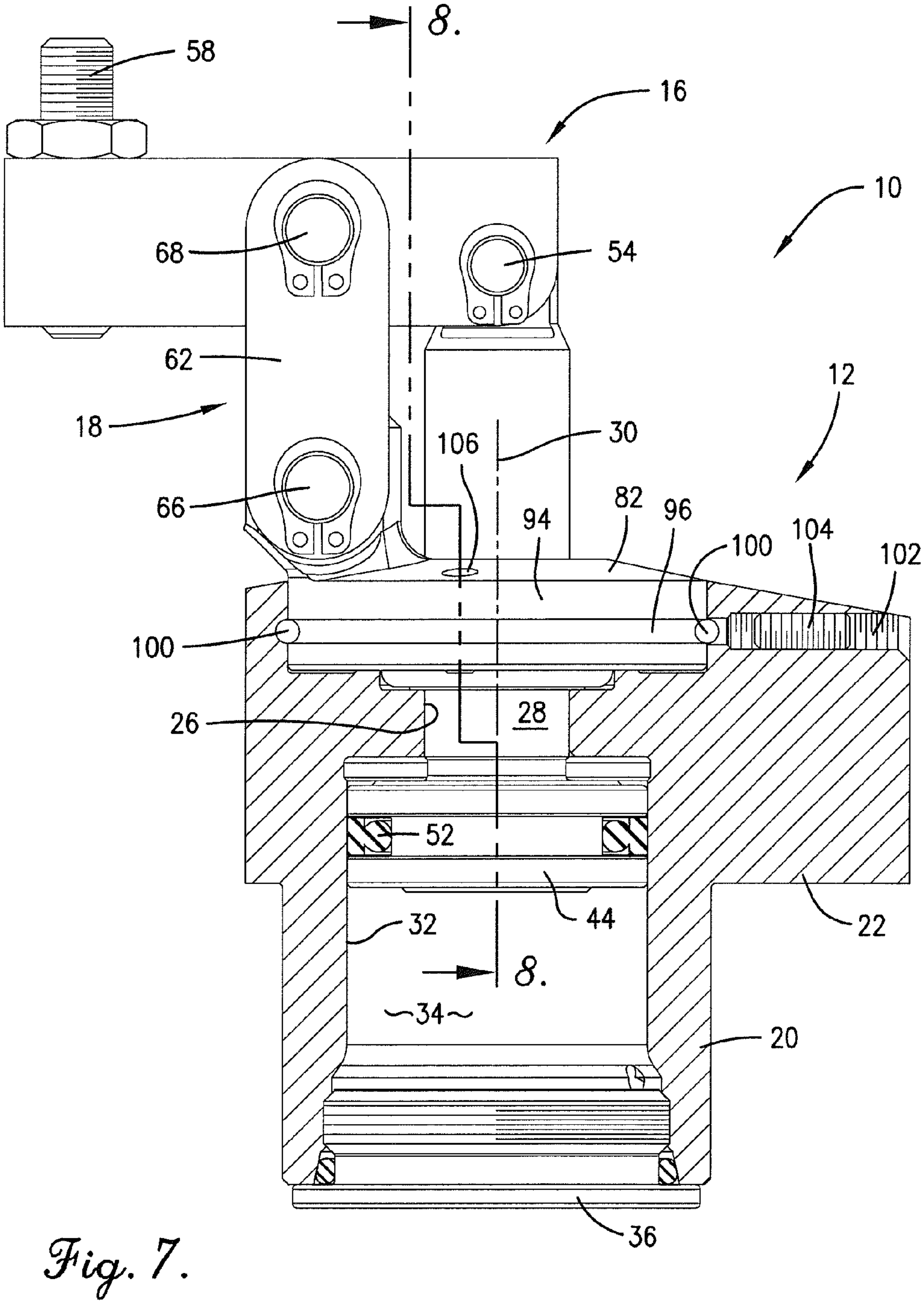
FIG. 7 is a side view of the link clamp in partial vertical section to better illustrate internal components of the clamp.
Figure 9:
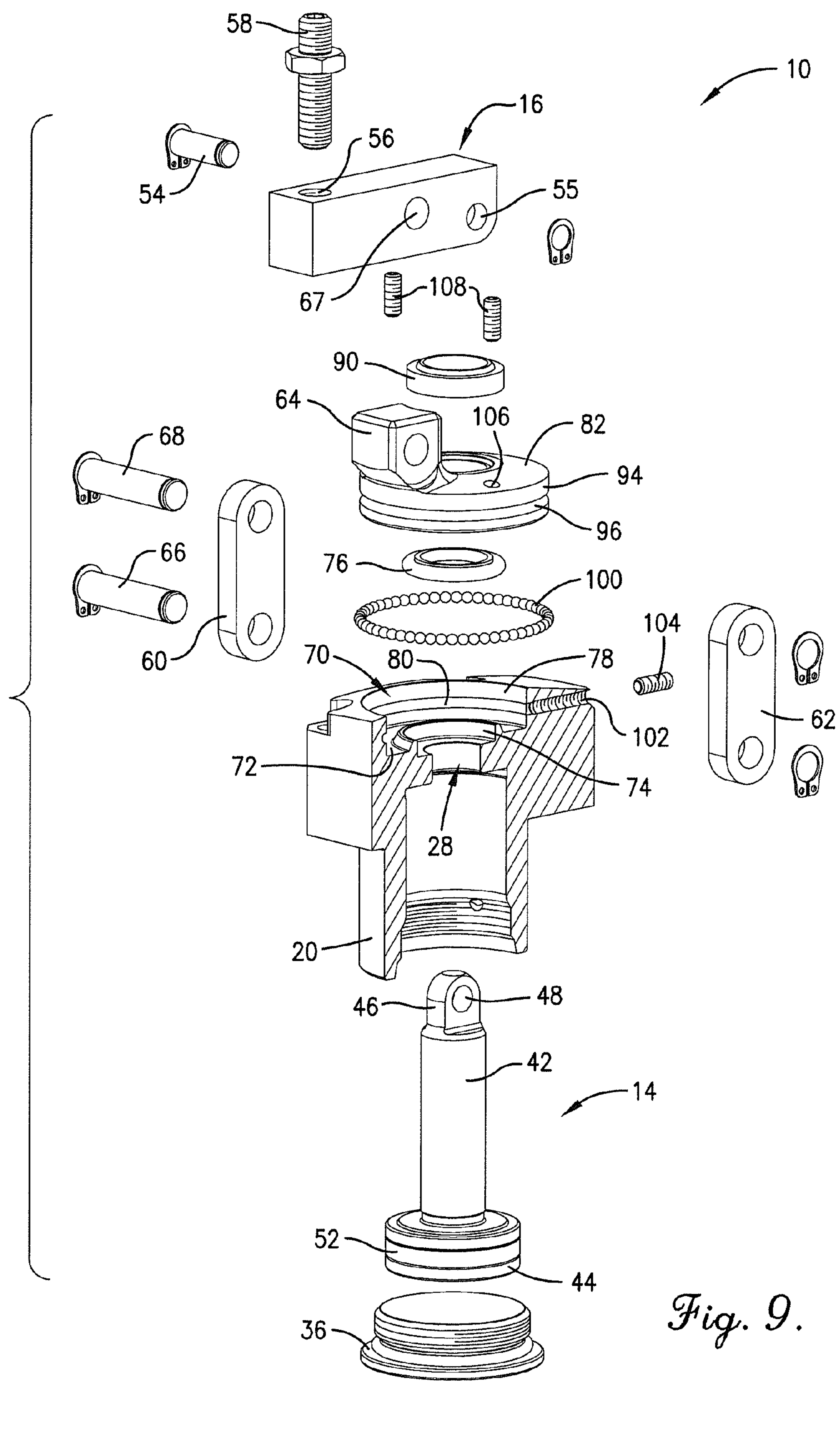
FIG. 9 is an exploded view of the link clamp with some components shown in vertical section.

As best illustrated in FIGS. 7 and 9, the mounting flange section 22 of the housing includes an inner wall 26 that defines a piston-receiving bore hole 28 with a longitudinal axis 30. The lower housing section 20 includes a larger diameter inner wall 32 that defines a piston chamber 34 beneath the bore hole 28. A removable retainer plug 36 may engage internal threads in the bottom of the piston chamber 34 to close the open end of the piston chamber.

Figure 2:
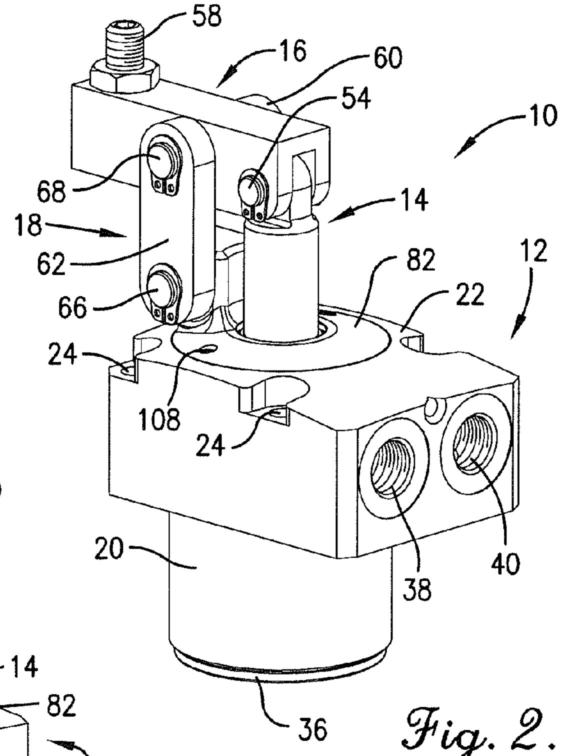
FIG. 2 is a rear/side perspective view of the link clamp of FIG. 1 shown with its clamping lever positioned in front of its housing and in a clamped position.

As best illustrated in FIG. 2, the mounting flange section 22 may include a pair of hydraulic ports 38, 40 that couple with conventional hydraulic tubing for supplying hydraulic fluid to and discharging hydraulic fluid from the piston chamber 34. The piston 14 moves relative to the housing 12 between an extended, clamped position illustrated in FIG. 1 and a retracted, released position illustrated in FIG. 3 when hydraulic fluid is delivered to or discharged from the hydraulic ports 38, 40. The clamp 10 may also include a flow control valve (not shown) positioned in the tubing or connected to the hydraulic ports for selectively varying the rate of hydraulic fluid flow supplied or discharged from the piston chamber 34 for selectively controlling the shifting speed of the piston 14.

The illustrated clamp 10 is a “double-acting” clamp that shifts between its clamped and released positions via hydraulic pressure. The clamp may be converted to a single-acting clamp by replacing one of the hydraulic ports 38, 40 with a spring or other biasing means (not shown). Alternatively, the clamp may include an electrically-driven motor or other means of shifting the piston 14, as the present technology is not limited to hydraulic clamps.

Figure 8:
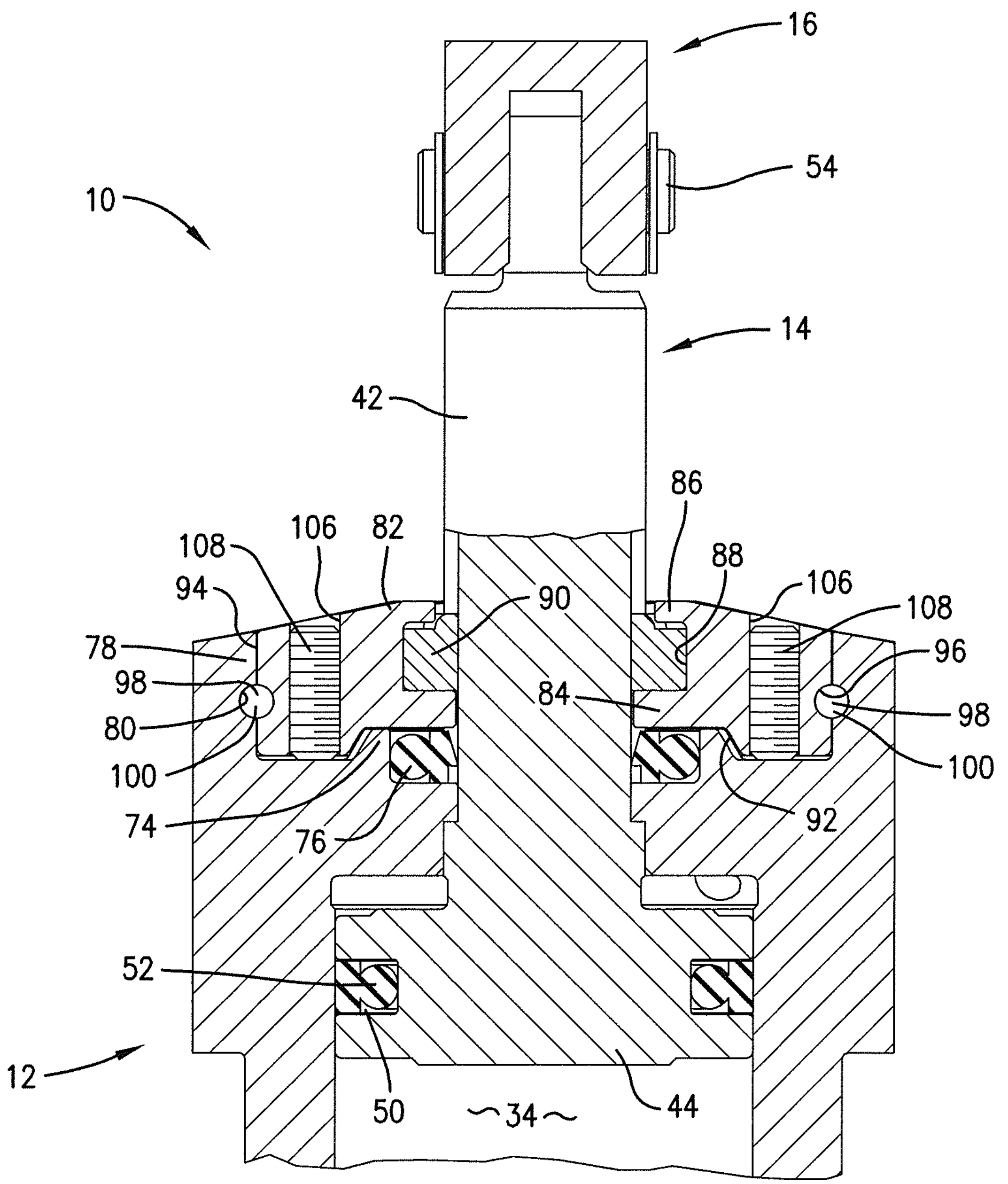
FIG. 8 is a vertical sectional view of the clamp taken along line 8-8 of FIG. 7.

The piston 14 is telescopically received within the piston chamber 34 and, as best illustrated in FIGS. 8 and 9, includes an elongated post or rod 42 that extends from the housing and an enlarged circular base 44 that moves within the piston chamber 34. The top of the piston includes a flange 46 with an eyelet 48 for coupling with the clamping lever as described below. The outer wall of the piston base includes a continuous annular slot 50 for receiving a gasket or seal 52.

The clamping lever or head 16 is pivotally attached to the top of the piston 14 by a pin or rod 54 that extends through holes 55 in the clamping lever and the eyelet 48. The free end of the clamping lever 16 may include a threaded hole 56 for receiving a bolt 58 or set screw, the bottom of which serves as a contact point for the clamping lever.

Figure 3:
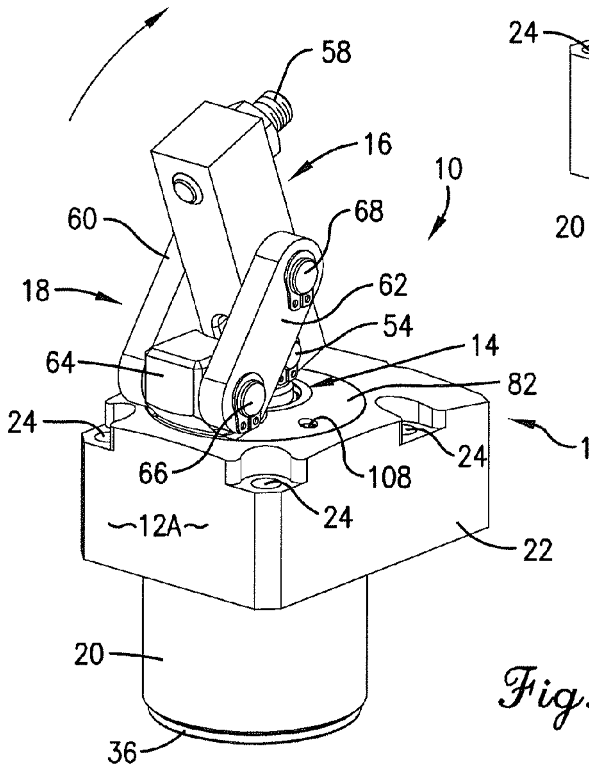
FIG. 3 is a front/side perspective view of the link clamp shown with its clamping lever positioned in front of its housing and in a released position.
Figure 5:
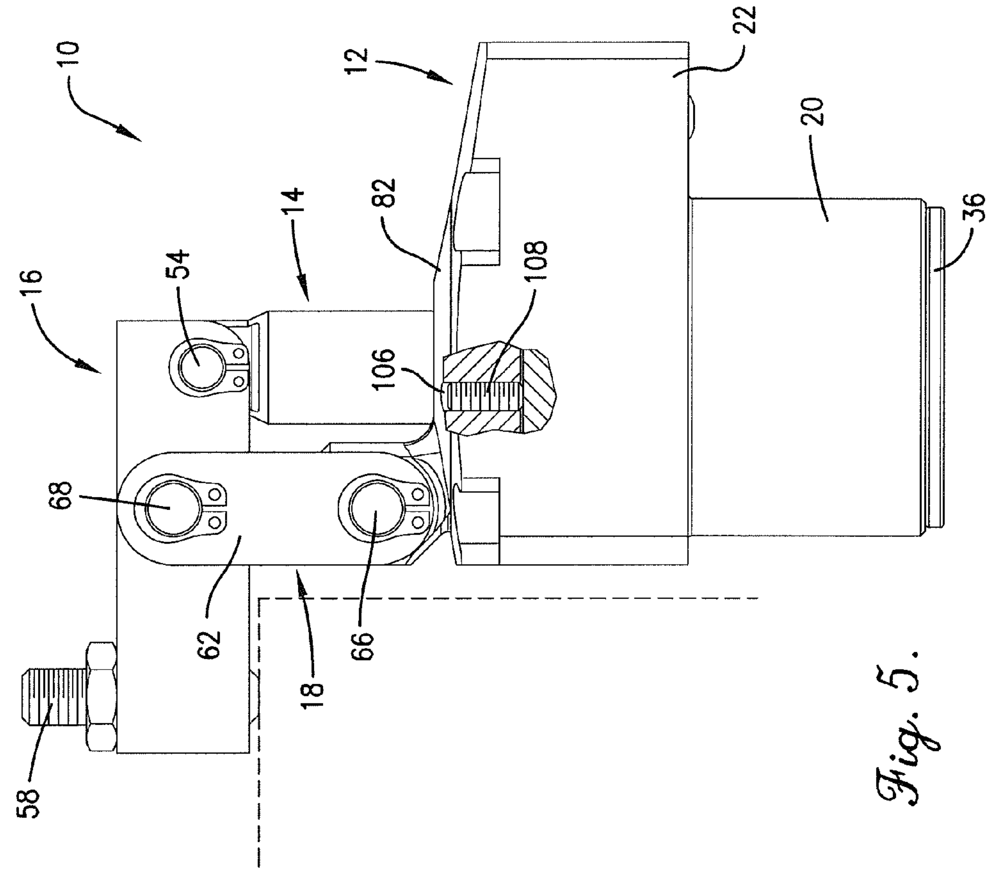
FIG. 5 is a side view of the link clamp shown with its clamping lever positioned in front of the housing and in a clamped position engaging a part shown in dashed lines.
Figure 4:
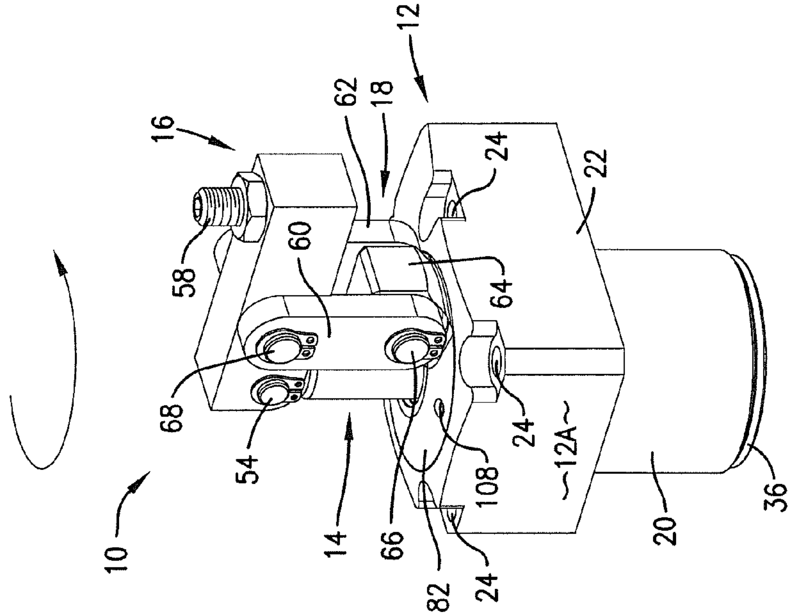
FIG. 4 is a front/side perspective view of the link clamp shown with its clamping lever positioned to one side of its housing and in a clamped position.
Figure 6:
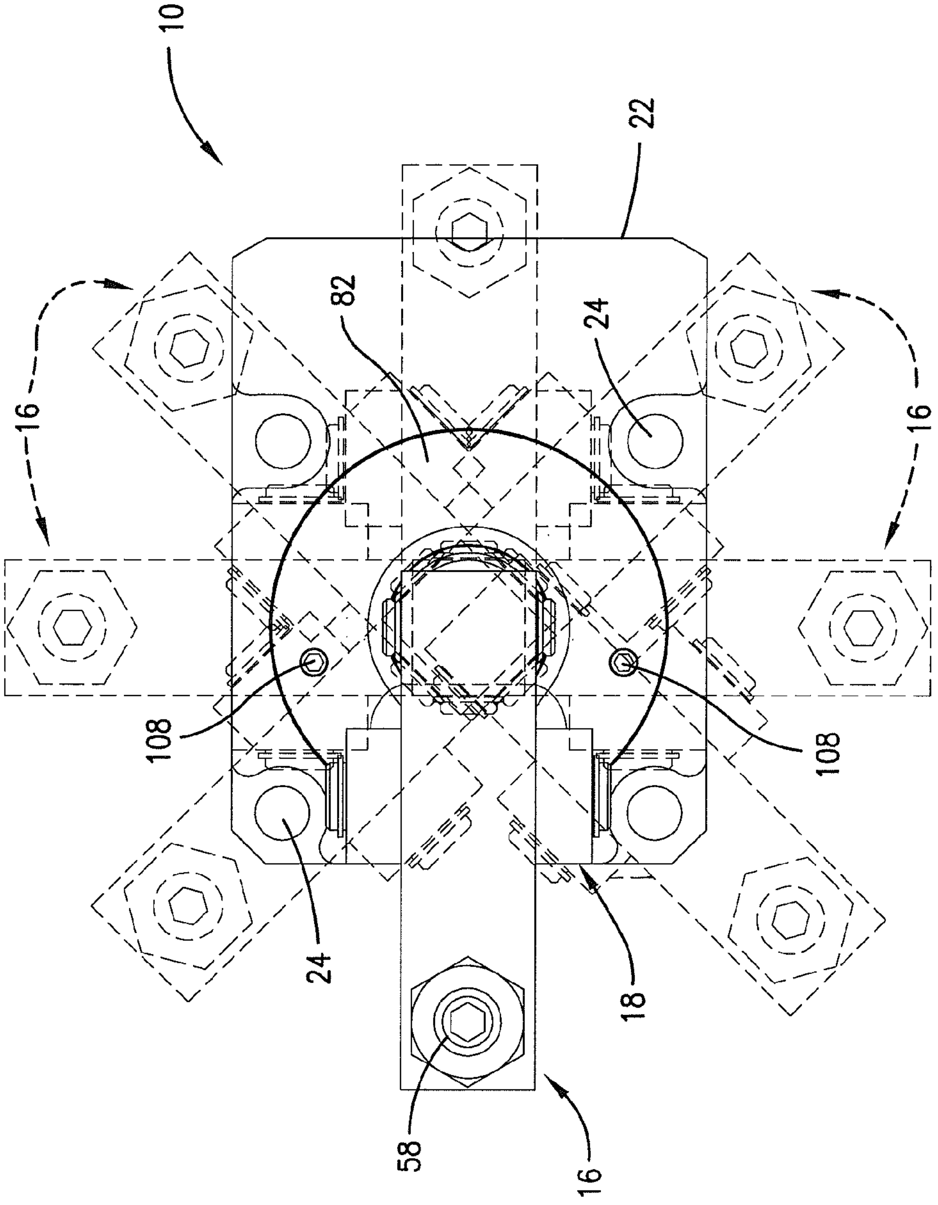
FIG. 6 is a top view of the link clamp with its clamping lever shown in solid lines in front of the housing and shown in dashed lines in various different angular positions relative to the housing.

The link assembly 18 is coupled with the clamping lever 16 for shifting it between its clamped and released positions. An embodiment of the link assembly comprises a pair of link arms 60, 62, each having a lower end pivotally connected to a mounting flange 64 atop the housing by a pin or shaft 66 and an upper end pivotally connected to a mounting hole 67 near the midpoint of the clamping lever by a pin or shaft 68. The link assembly 18 shifts the clamping lever to its clamped position when the piston 14 is extended as shown in FIG. 1 and shifts the clamping lever to its released position when the piston is retracted as shown in FIG. 3.

Structure for permitting relative rotational movement of the piston 14 and clamping lever 16 with respect to the housing 12 will now be described with reference to FIGS. 8 and 9. In one embodiment, an enlarged circular recess 70 formed in the top of the mounting flange section 22 of the housing as best illustrated in FIG. 9. The recess 70 has a floor 72 with a raised circular rail 74 that encircles the piston-receiving bore hole 28. As best illustrated in FIG. 8, a gasket or seal 76 may be positioned inboard of the rail 74 for facilitating the telescopic movement of the piston 14 relative to the housing 12. The recess 70 also has a substantially vertically-extending bearing wall 78 provided with a continuous groove 80, the purpose of which is described below.

A circular lug 82 is rotatably positioned in the circular recess 70. As best shown in FIG. 8, the lug 82 includes an inwardly projecting lower shelf 84 that defines a central hole aligned with the bore 28 in the housing for permitting the piston 14 to extend through the lug. The shelf 84 along with another inwardly projecting shelf 86 above the shelf 84 cooperate to create a slot 88 for receiving a gasket or seal 90 surrounding the piston 14. The lug 82 also has a circular recess 92 in its lower surface for positioning over the circular rail 74.

As best illustrated in FIGS. 8 and 9, the lug 82 has a substantially vertically-extending outer bearing wall 94 provided with a continuous groove 96 that mates with the groove 80 in the bearing wall 78 of the recess to cooperatively define a ball bearing receiving channel 98. As shown in FIG. 9, a plurality of ball bearings 100 may be placed in the channel to facilitate rotation of the lug 82 in the recess 70 while retaining the lug in the recess.

The ball bearings 100 may be inserted in and removed from the channel 98 by way of a channel 102 extending through the mounting flange section 22 of the housing 12. The opening in the channel 102 may have internal threads for receiving a threaded set screw 104 or other plug for retaining the ball bearings in the channels.

The lug 82 also has one or more substantially vertically-extending holes 106 with internal threads for receiving threaded set screws 108. The set screws may be tightened to lock the rotational position of the lug 82, piston 14, and clamping lever 16 relative to the housing 12 as described below.

In other embodiments, the lug may be rotatably mounted over the mounting flange section 22 rather than positioned in the recess 70.

In use, the link clamp 10 may be secured to a fixture along with other similar clamps in a conventional manner. The link clamp's clamping lever 16 may then be rotated relative to the housing 12 to adjust the contact point of the clamping lever on the part being held on the fixture. To do so, the set screws 108 in the lug 82 are loosened so that the lug 82 may rotate freely in the circular recess 70 of the housing. The lug, clamping lever, and piston may then be rotated to a desired position by simply gripping the clamping lever and turning the lug within the recess. Importantly, turning the lug does not change the distance between the underside of the clamping lever and the mounting flange of the housing. Thus, changing the rotational position of the clamping lever relative to the housing does not alter the distance between the contact point on the clamping lever and the top of the part to be held. When the clamping lever is in the desired position relative to the housing, the set screws 108 may be tightened to lock the lug in place relative to the housing. The piston may then be operated to shift the clamping lever between its clamped and released positions.

Although the invention has been described with reference to the preferred embodiment illustrated in the attached drawing figures, it is noted that equivalents may be employed and substitutions made herein without departing from the scope of the invention as recited in the claims. For example, although an embodiment of the link clamp is driven by hydraulic pressure, it may alternatively be electrically driven or moved by other means.

Having thus described the preferred embodiment of the invention, what is claimed as new and desired to be protected by Letters Patent includes the following:

The invention claimed is:

1. A link clamp for holding a part on a fixture, the link clamp comprising:
- a housing with a bore having a longitudinal axis;
- a piston received in the bore and shiftable between retracted and extended positions;
- a clamping lever pivotally connected to one end of the piston, the clamping lever configured to rotate relative to the housing in a single plane substantially perpendicular to the longitudinal axis of the bore; and
- a link coupled with the clamping lever for shifting the clamping lever to a clamped position when the piston is shifted to the extended position and for shifting the clamping lever to a released position when the piston is shifted to the retracted position.

2. The link clamp of claim 1, the housing having a circular recess with a floor and a raised circular rail extending from the floor and surrounding the central bore.

3. The link clamp of claim 2, further comprising a circular lug rotatably positioned in the circular recess for supporting the link and permitting the clamping lever to be rotated relative to the housing.

4. The link clamp of claim 3, the circular lug having a lower surface with a circular recess for positioning over the raised circular rail in the circular recess.

5. The link clamp of claim 3, the circular recess further having a bearing wall provided with a continuous groove.

6. The link clamp of claim 5, the circular lug further having a bearing wall provided with a continuous groove that mates with the continuous groove in the circular recess to define a ball bearing receiving channel.

7. The link clamp of claim 6, further comprising a plurality of ball bearings positioned in the ball bearing receiving channel for facilitating relative rotational movement between the circular lug and the circular recess and for retaining the circular lug in the circular recess.

8. The link clamp of claim 7, the housing having a channel in communication with the ball bearing receiving channel for inserting the ball bearings in and removing the ball bearings from the ball bearing receiving channel.

9. The link clamp of claim 1, wherein the piston is shifted between its retracted and extended positions by hydraulic fluid, springs, or an electric motor.

10. A link clamp for holding a part on a fixture, the link clamp comprising:
- a housing having a circular recess;
- a piston received in the housing and shiftable between retracted and extended positions;
- a clamping lever pivotally connected to a distal end of the piston;
- a link coupled with the clamping lever for shifting the clamping lever to a clamped position when the piston is shifted to the extended position and for shifting the clamping lever to a released position when the piston is shifted to the retracted position; and
- a circular lug rotatably positioned in the circular recess for supporting the link and permitting the clamping lever to be rotated relative to the housing.

11. The link clamp of claim 10, the circular recess having a floor and a raised circular rail extending from the floor, the circular lug having a lower surface with a circular recess for positioning over the raised circular rail in the circular recess.

12. The link clamp of claim 11, the circular recess further having a bearing wall provided with a continuous groove.

13. The link clamp of claim 12, the circular lug further having a bearing wall provided with a continuous groove that mates with the continuous groove in the circular recess to define a ball bearing receiving channel.

14. The link clamp of claim 13, further comprising a plurality of ball bearings positioned in the ball bearing receiving channel for facilitating relative rotational movement between the circular lug and the circular recess and for retaining the circular lug in the circular recess.

15. The link clamp of claim 14, the housing having a channel in communication with the ball bearing receiving channel for inserting the ball bearings in and removing the ball bearings from the ball bearing receiving channel.

16. The link clamp of claim 10, wherein the piston is shifted between its retracted and extended positions by hydraulic fluid, springs, or on electric motor.

17. A link clamp for holding a part on a fixture, the link clamp comprising:

a housing having a circular recess with a floor and a raised circular rail extending from the floor;

a piston received in the housing and shiftable between retracted and extended positions;

a clamping lever pivotally connected to a distal end of the piston;

a link coupled with the clamping lever for shifting the clamping lever to a clamped position when the piston is shifted to the extended position and for shifting the clamping lever to a released position when the piston is shifted to the retracted position; and a circular lug rotatably positioned in the circular recess for supporting the link and permitting the clamping lever to be rotated relative to the housing, the circular lug having a lower surface with a circular recess for positioning over the raised circular rail in the circular recess.

18. The link clamp of claim 17, the circular recess further having a bearing wall provided with a continuous groove.

19. The link clamp of claim 18, the circular lug further having a bearing wall provided with a continuous groove that mates with the continuous groove in the circular recess to define a ball bearing receiving channel.

20. The link clamp of claim 19, further comprising a plurality of ball bearings positioned in the ball bearing receiving channel for facilitating relative rotational movement between the circular lug and the circular recess and for retaining the circular lug in the circular recess.

* * * * *